(12) United States Patent
Jessup et al.

(10) Patent No.: US 6,322,140 B1
(45) Date of Patent: Nov. 27, 2001

(54) SEAT AND OCCUPANT RESTRAINT SYSTEM

(75) Inventors: Chris P. Jessup, Sheridan; Harry W. Templin, Carmel; Jeffry L. Williams, Zionsville; William J. Hurley, Carmel, all of IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 09/361,069

(22) Filed: Jul. 26, 1999

Related U.S. Application Data

(63) Continuation-in-part of application No. 08/604,753, filed on Feb. 23, 1996, which is a continuation-in-part of application No. 08/266,020, filed on Jun. 27, 1994, now Pat. No. 5,451,094.

(51) Int. Cl.[7] ............................. B60N 2/42; B60R 21/00
(52) U.S. Cl. .................. 297/216.17; 297/480; 297/468; 296/68.1
(58) Field of Search ................. 297/216.16, 216.17, 297/216.19, 216.2, 480, 468; 296/68.1

(56) References Cited

U.S. PATENT DOCUMENTS

| | | |
|---|---|---|
| 2,880,815 | 4/1959 | Apfelbaum . |
| 3,357,736 | 12/1967 | McCarthy . |
| 3,832,000 | 8/1974 | McDonnell . |
| 3,858,930 | 1/1975 | Colandra et al. . |
| 3,992,046 | 11/1976 | Beness . |
| 4,025,110 | 5/1977 | Poorman . |
| 4,154,472 | 5/1979 | Bryll . |
| 4,257,626 | 3/1981 | Adomeit . |
| 5,015,010 | 5/1991 | Homeier et al. . |
| 5,219,207 | 6/1993 | Anthony et al. . |
| 5,492,368 | 2/1996 | Pywell et al. . |

FOREIGN PATENT DOCUMENTS

| | | |
|---|---|---|
| 36 31 881 A1 | 4/1988 | (DE) . |
| 43 00 801 A1 | 7/1994 | (DE) . |
| 2 419 079 | 3/1981 | (FR) . |

Primary Examiner—Anthony D. Barfield
(74) Attorney, Agent, or Firm—Woodard, Emhardt, Naughton, Moriarty & McNett

(57) ABSTRACT

A restraint system for moving a vehicle seat and occupant toward the vehicle floor. In one embodiment a fluid cylinder pivotally mounted to the floor has an extendable piston rod connected to a linkage mounted to the vehicle seat. A three point belt assembly mounted to the seat is connected to the cylinder rod. Retraction of the cylinder rod pretensions or tightens the three point buckle assembly and subsequently moves the seat towards the vehicle floor. In an alternate embodiment a displacement member including at least a flexible portion is connected at one end to a piston within a fluid cylinder and is connected at the other end to the linkage. An angle between 0 and 180 degrees is imparted to the flexible portion of the displacement member, allowing the cylinder to be oriented in alternate directions for space efficiency. Retraction of the cylinder rod tightens the three point buckle assembly and moves the seat towards the vehicle floor.

19 Claims, 9 Drawing Sheets

SEAT AND OCCUPANT RESTRAINT SYSTEM

This is a continuation-in-part application of application Ser. No. 08/604,753 filed Feb. 23, 1996 which is a c-i-p application of application Ser. No. 08/266,020, filed Jun. 27, 1994 and which issued as U.S. Pat. No. 5,451,094.

BACKGROUND OF THE INVENTION

1. Field of the Invention

This invention is in the field of tethers, harnesses, and other restraint systems used in vehicles.

2. Description of the Prior Art

A variety of different types of restraint systems have been devised for securing passengers, cargo and seat within a vehicle. For example, the commonly owned U.S. Pat. No. 5,015,010 discloses a tether securing a seat frame to a vehicle floor, a three point belt system entirely mounted to the seat frame restraining the seat occupant, and a retractor belt combination extending between the vehicle floor and the top of the seat isolating the seat back from passenger force exerted against the seat belt.

In order to limit suspension seat movement during a crash, it has been the practice to tether the seat to the floor; however, a fixed tether limits the horizontal adjustability of the seat. In the commonly owned U.S. Pat. No. 5,219,207, an automatic locking tether for the vehicle seat is disclosed wherein the seat may be horizontally adjusted to the specific requirement of the occupant. Passenger loading during a crash results in the automatic locking, of the tether.

Seats provided within large trucks typically are suspendedly mounted atop the vehicle floor. For example, a cushioned air bag may be positioned between the bottom of the seat and floor thereby providing a cushioned ride. Such seats are typically positioned a substantial distance from the vehicle floor. It is therefore desirable to provide a restraint system which will move the seat and occupant toward the floor during a crash thereby providing a more compact seat occupant envelope. Disclosed herein is such a system.

SUMMARY OF THE INVENTION

One embodiment of the present invention is a device for retracting a vehicle seat having a seat back during a crash of the vehicle comprising a seat retractor connected between the seat and the vehicle and operable upon crash of the vehicle to move the seat toward the floor.

Another embodiment of the present invention includes a seat retractor upon crash of a vehicle for moving the vehicle seat toward the vehicle floor. The seat has a belt device mounted to the seat to restrain an occupant thereon. A belt retractor is connected between the seat retractor and the belt device and is operable upon crash of the vehicle to tighten the belt device prior to or during the seat retractor moving the seat toward the floor.

In a further embodiment of the present invention, a belt device is mounted via a linkage to the seat and seat frame. A displacement member has a first end connected to the linkage and a second end connected to a piston in a fluid cylinder. The fluid cylinder has a longitudinal cylinder axis and the displacement member defines a tension axis in a line including the linkage and at least a portion of the displacement member. A bearing or pulley imparts an angle to a flexible portion of the displacement member between the cylinder axis and the tension axis. Upon crash, fluid pressure is applied to the piston to move it within the fluid cylinder, displacing the displacement member and moving the seat towards the vehicle floor.

It is an object of the present invention to provide a restraint system for a vehicle seat and occupant.

A further object of the present invention is to provide a restraint system for moving a vehicle suspension seat towards the vehicle floor during a crash.

An additional object of one embodiment of the present invention is to provide a restraint system operable upon crash of the vehicle to both tighten the seat belt and move the seat with occupant towards the vehicle floor.

Related objects and advantages of the present invention will be apparent from the following description.

DESCRIPTION OF PREFERRED EMBODIMENTS

Figure 1:
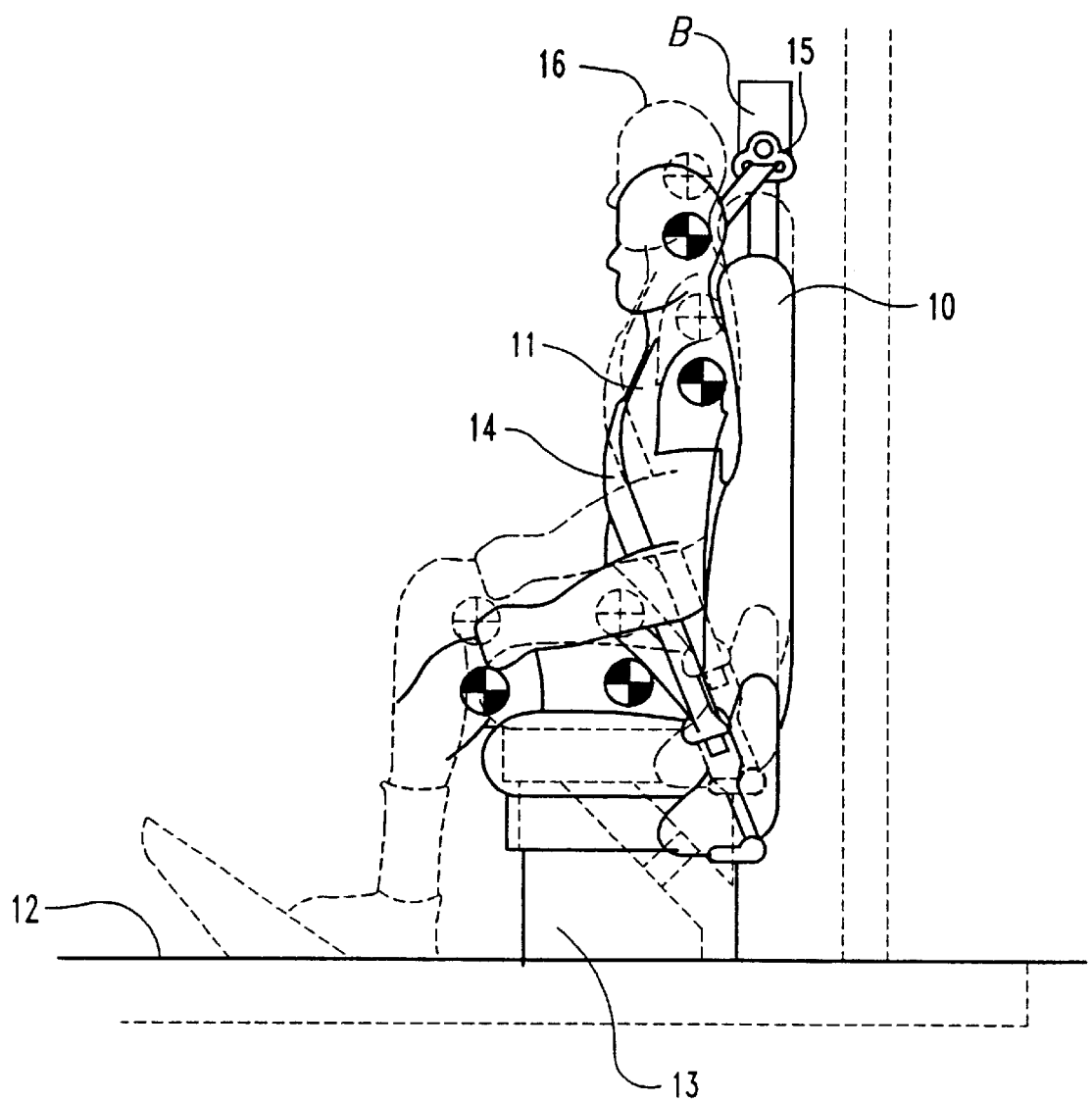
FIG. 1 is a side view of a vehicle seat showing vertical excursion.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 depicts a typical suspension seat 10 utilized in a heavy truck. Seat 10 is mounted by means of an air bag within housing 13 atop vehicle floor 12. Occupant 11 is secured within the seat by means of a conventional three point belt assembly 14 with the belt extending through a D-loop 15 mounted to the B pillar of the truck. One end of the belt is secured to a retractor mounted either directly to the vehicle or to the frame of the seat. Dash line 16 depicts the upper limit of the vertical movement of the occupant.

The amount of vertical movement will vary with each type of seat; however, a typical seat has a vertical movement of approximately four to six inches unless the vehicle rolls over in which case the vertical movement of the occupant may increase to approximately nine inches when the vehicle is in an upsidedown condition.

Figure 3:
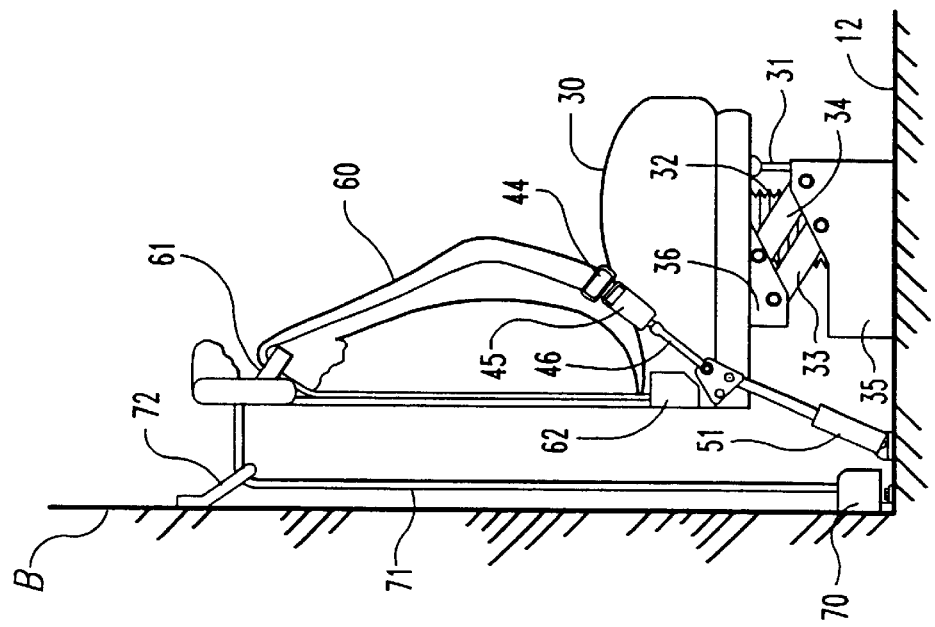
FIG. 3 is a side view of a first alternate embodiment of the seat incorporating the present invention.
Figure 2:
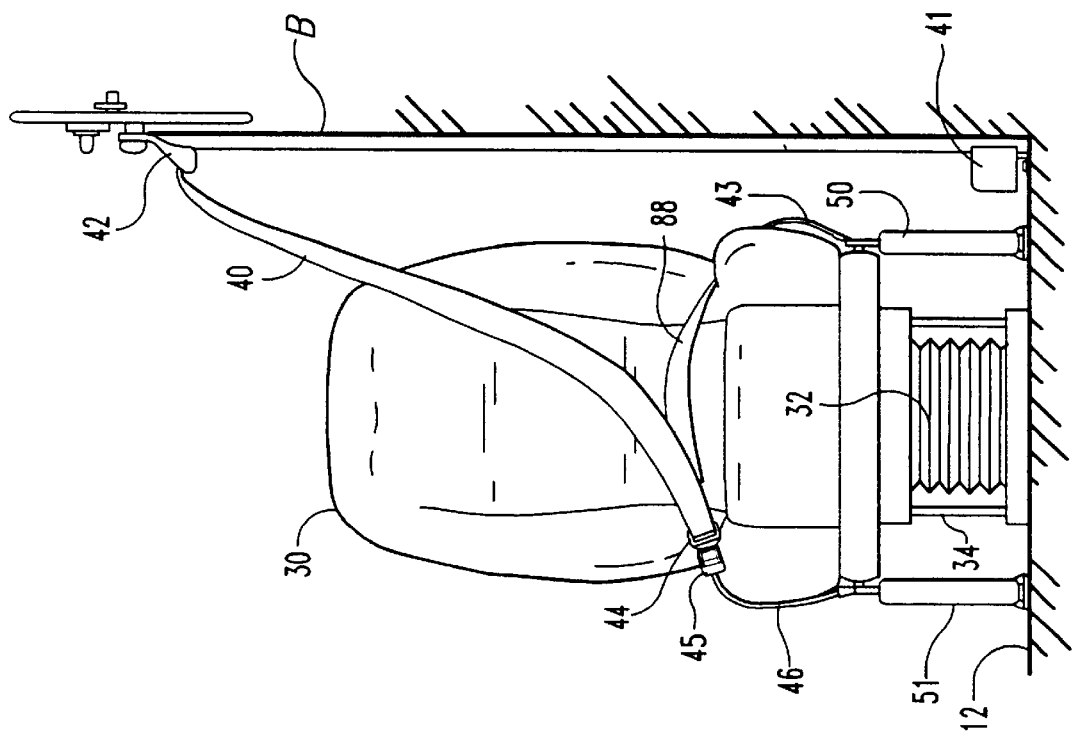
FIG. 2 is a front view of a preferred embodiment of the seat incorporating the present invention.

FIG. 2 and 3 illustrate respectively the preferred and alternate embodiments of the restraint systems incorporating the present invention. Seats 30 of FIGS. 2 and 3 are identical except in FIG. 2 the retractor and D-loop used with the seat belt are mounted external of the seat, whereas in FIG. 3 the D-loop and associated retractor are mounted directly to the seat. In FIG. 3 an additional retractor and associated belt are used to isolate the seat back from passenger force applied to the belt during a crash. The restraint systems incorporating the present invention for moving the seat and occupant toward the vehicle flow are identical for use with the seats of FIGS. 2 and 3.

The conventional truck suspension vehicle seat includes an air spring, fluid bag or mechanical spring 32 (FIG. 3) positioned between the bottom of the seat frame and vehicle floor 12. A pair of links 33 and 34 have their opposite ends pivotally mounted to depending brackets 36 attached to the seat frame and an upwardly extending bracket 35 mounted atop floor 12. Links 33 and 34 and brackets 35 and 36 are provided on each side of the seat allowing the seat to move vertical in a controlled manner. The front end and rear end of the seat typically move simultaneously, allowing the seat to move in its entirety. A conventional shock absorbing telescoping device 31 is fixed to and extends between the bottom of the seat frame and bracket 35. Device 31 is not shown in FIG. 2 to more clearly illustrate spring 32. The occupant may adjust the height of the seat by controlling the fluid pressure to spring 32. Conventional fluid or spring controls are provided connecting the air bag to a source of pressurized fluid such as air or adjusting the spring.

A three point belt assembly 40 (FIG. 2) has one end of the belt attached to retractor 41 mounted to the vehicle floor with the belt then extending upwardly through a D-loop 42 mounted to the vehicle B pillar. The belt extends downwardly from D-loop 42 across the occupant and slidably through a conventional seat belt tongue 44 with the belt then extending from the tongue across the lap of the occupant with the opposite end 43 of the belt 88 connected to the restraint device 50 incorporating the present invention. A conventional seat belt buckle 45 is releasably lockable with tongue 44 and is mounted to a strap or other extending member 46, in turn, having its opposite end connected to restraint device 51. Restraint devices 50 and 51 are identical and are operable to pull the three point belt assembly 40 and seat downwardly in the crash mode.

The three point belt assembly 60 shown in FIG. 3 is identical to the three point belt assembly 40 with the exception that D-loop 61 is mounted directly to the back of the seat as contrasted to the mounting of D-loop 42 to the B pillar. Further, one end of the belt utilized in the three point belt assembly 60 is connected to retractor 62 mounted directly to the seat frame. Thus, in the embodiment shown in FIG. 3, the belt extends upwardly from retractor 62 through D-loop 61 and then downwardly across the occupant with the belt then slidably extending through tongue 44 with the opposite end of the belt being attached to a restraint device 50 positioned on the opposite side of the seat from that depicted in FIG. 3. Likewise, buckle 45 in FIG. 3 is connected to a belt, cable 46 or other elongated device, in turn, connected to restraint device 51. A three point belt assembly and D-loop, wherein the D-loop is mounted to the B pillar but the retractor for the three point belt assembly is mounted directly to the seat frame is disclosed in the commonly owned U.S. Pat. No. 5,176,402 which is herein incorporated by reference.

In FIG. 3, an additional retractor 70 is mounted directly to the vehicle having a belt 71 which extends upwardly through guide 72 affixed to the B pillar with the end of the belt attached to D-loop 61 such as shown in the commonly owned U.S. Pat. No. 5,015,010 which is herewith incorporated by reference. Retractor 70 is therefore operable to isolate the seat back from the forces exerted by the passenger against the three point belt assembly 60 by directing the forces directly from the belt to D-loop 61 and then via belt 71 to the vehicle instead of directing the force to the back of the seat for absorption. In an alternate embodiment retractor 70 and guide 72 are not used.

Figure 4:
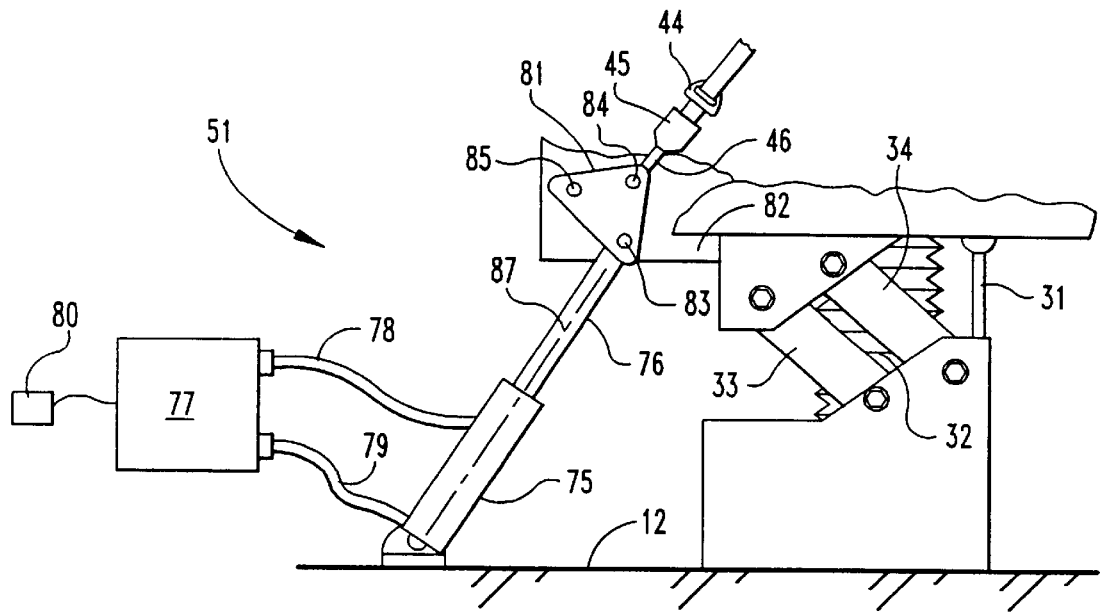
FIG. 4 is an enlarged fragmentary view of the seat of FIG. 3 in a normal mode.
Figure 5:
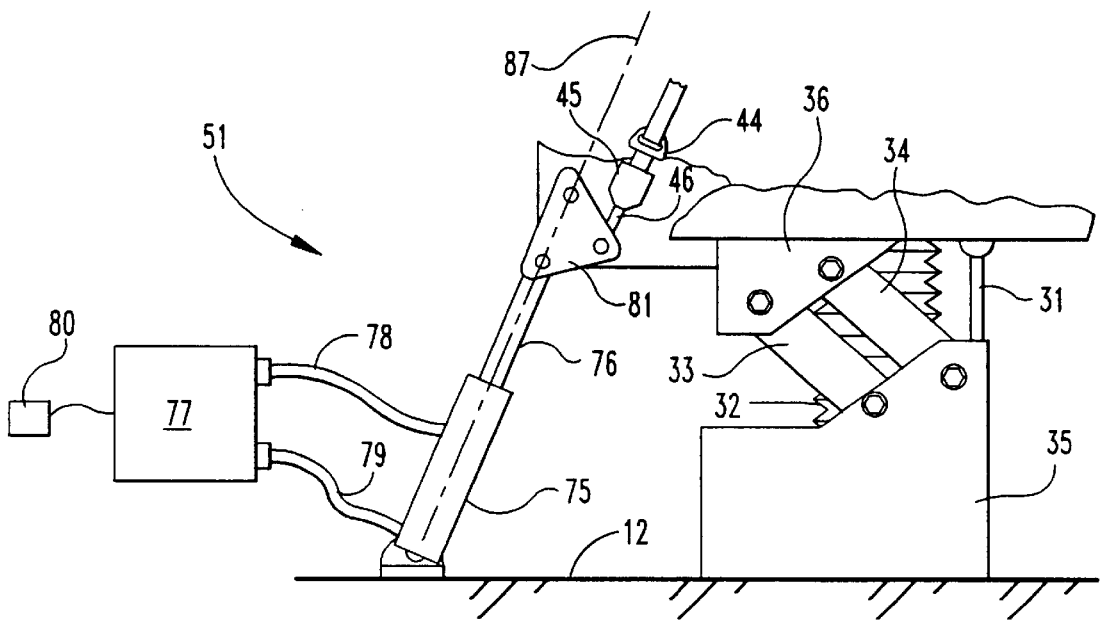
FIG. 5 is the same view as FIG. 4 only showing the seat in a crash mode.
Figure 7:
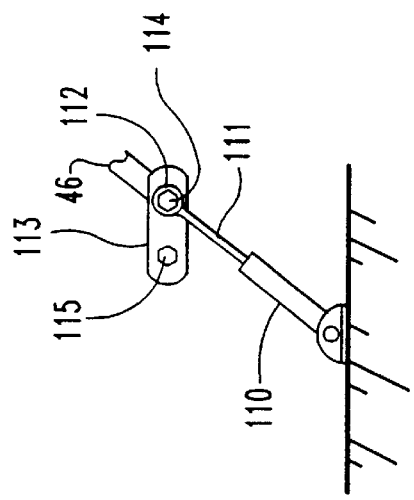
FIG. 6–9 are side diagrammatic views of various alternate linkages for the seat of FIGS. 2 and 3.
Figure 9:
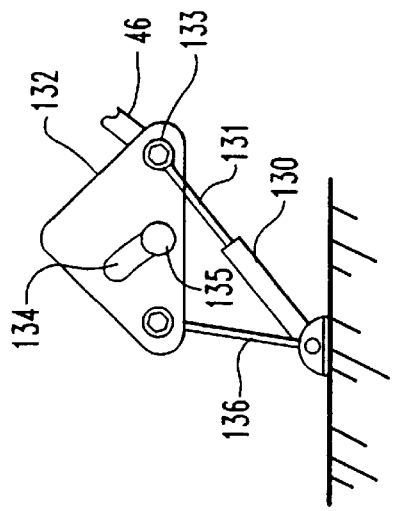
Figure 6:
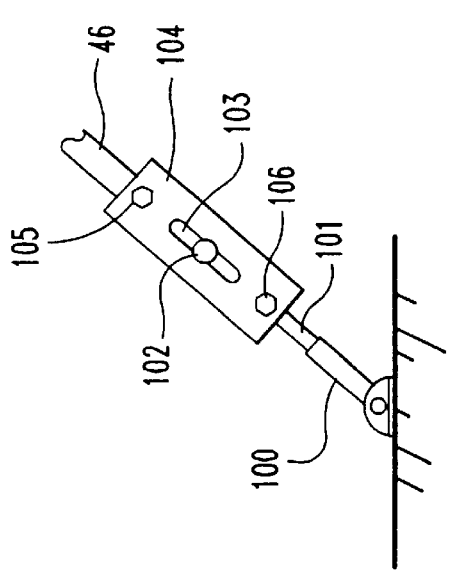
Figure 8:
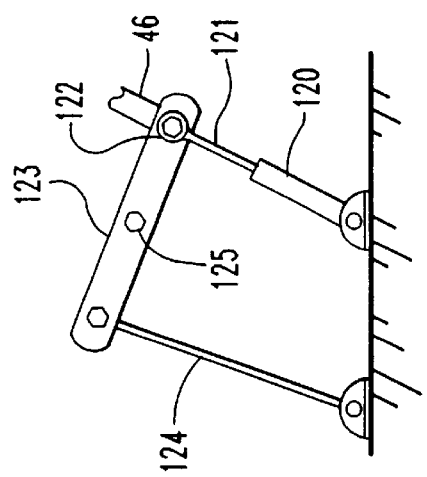

Restraint devices 50 and 51 are identical and thus the following description for restraint device 51 will apply equally to device 50. Restraint device 51 is depicted in FIG. 4 in the normal mode and in FIG. 5 in the crash mode. The restraint device includes a fluid cylinder 75 pivotally mounted to vehicle floor 12. The cylinder has an extendable and retractable piston rod 76 with cylinder 75 connected to a source of pressurized fluid 77 via fluid lines 78 and 79. A conventional crash sensor 80, operably to detect motion changes, a frontal crash or a rollover event, is connected via conventional circuitry to source 77 and is operable when the vehicle crashes to detect changes in velocity or a rollover, activating the source of pressurized fluid 77 and causing cylinder 75 to retract piston rod 76.

The outer distal end of piston rod 76 is pivotally mounted by pivot joint 83 to a timing plate 81 pivotally mounted by pivot joint 85 to seat frame 82. Seat belt buckle 45 is connected by member 46 by pivot joint 84 to timing plate 81. Prior to crash, pivot joint 85 is located at a position spaced apart from axis 87 (FIG. 4) which extends along the length of pivot rod 76. Once sensor 80 has detected a change in vehicle velocity, piston rod 76 is retracted thereby pivoting timing plate 81 in a clockwise direction, as viewed in FIG. 4, about pivot joint 85 until pivot joint 85 is located on axis 87. As plate 81 moves from the position of FIG. 4 to the position of FIG. 5, buckle 45, tongue 44 and the three point belt assembly will be pulled downwardly and tightened thereby moving the occupant downwardly into the cushion of the seat. Simultaneously, the opposite end 43 (FIG. 2) of the lap portion 88 of the belt is pulled downwardly by restraint device 50 and retractor 41 or 62 lock preventing further extension of the belt. Even though retractors 41 and 62 have locked, the retracting devices 50 and 51 will pull the occupant and seat downwardly towards the vehicle floor since the belt in the three point belt assembly will stretch and further due to the normal slack existing in the three point belt assembly. Once plate 81 has pivoted to the position depicted in FIG. 5, pivot joint 85 is located on axis 87 and further retraction of rod 76 will pull seat frame 82 downwardly toward the vehicle floor. Various timing linkages are possible in addition to the timing plate 81. Such alternate linkages are depicted in FIGS. 6–9.

Fluid cylinder 100 (FIG.6 ) is pivotally mounted to the vehicle floor and has an extendable and retractable piston rod 101 with a distal end 106 pivotally connected to plate 104. Buckle 45 is connected to member 46 in turn pivotally connected by joint 105 to plate 104. Buckle 45 along with sensor 80 and the source of pressurized fluid 77 have not been shown in FIGS. 6–9; however, it is to be understood that the buckle and source of pressurized fluid are connected respectively to member 46 and the fluid cylinder in a manner similar to that depicted in FIG. 4. Projection 102 is fixedly mounted to seat frame 82 and is slidable within slot 103 of plate 104. Retraction of rod 101 causes end 106 and plate 104 to move downwardly thereby pulling downward buckle 45 and the attached three point belt assembly. Eventually, projection 102 will reach the top end of slot 103 thereby transferring the downward pull to seat frame 82 forcing the seat downward. Plate 104 is pivotally mounted to projection 102 allowing the buckle to be positioned conveniently with respect to the seat occupant.

Fluid cylinder 110 (FIG. 7) is pivotally mounted to the vehicle floor and has an extendable piston rod 111 with a distal end 112 pivotally connected to linkage 113. End 112 of rod 111 is positioned at one end of linkage 113 and is also connected via pivot joint 114 to member 46, in turn, attached to buckle 45. The opposite end of linkage 113 is connected via pivot joint 115 to seat frame 82. Retraction of rod 111 results in the downward movement of pivot joint 114 and member 46 along with the three point belt assembly pulling the occupant downward until eventually linkage 113 has pivoted sufficiently clockwise to align pivot joints 114 and 115 with the longitudinal axis of rod 111 thereby transferring the downward force to seat frame 82 and pulling the seat downwardly towards the floor.

Fluid cylinder 120 (FIG. 8) is pivotally mounted to the vehicle floor and has an extendable piston rod 121 with an outer distal end 122 pivotally connected to one end of linkage 123 with the opposite end of the linkage tethered to the vehicle floor by means of cable or web 124. Linkage 123 is pivotally mounted to the seat extension 82 via pivot joint 125 whereas member 46 attached to buckle 45 is pivotally connected to the distal end 122 of piston rod 121. Thus, retraction of piston rod 121 results in the clockwise rotation of linkage 123 about pivot joint 125 until cable 124 assumes a taut condition. Prior to cable 124 becoming taut, retraction of piston rod 121 will pull the three point buckle assembly downward. Once cable 124 is taut, further retraction of piston rod 121 will result in the downward force being applied to pivot joint 125 pulling the seat downwardly.

Fluid cylinder 130 (FIG. 9) is pivotally mounted to the vehicle floor and has an extendable piston rod 131 with an outer end 133 pivotally connected to plate 132 having a slot 134 through which projection 135 extends. Projection 135 is fixedly mounted to seat extension 82 and is slidable along the length of slot 134. The opposite end of plate 132 is connected to the vehicle floor by means of rigid member 136. Member 46 connected to buckle 45 is pivotally connected to the distal end 133 of piston rod 131. Thus, retraction of piston rod 131 results in downward force being applied to the buckle thereby pulling downward the three point buckle assembly until eventually plate 132 moves sufficiently positioning projection 135 at the upper end of slot 134. Further retraction of piston rod 131 thereby transfers the downward pull to projection 135 and the seat frame resulting in the seat being pulled downwardly toward the floor. As shown in FIG. 2, the seat is equipped with a restraint device 50 and 51 on the opposite sides of the seat. Thus, the fluid cylinders and accompanying linkages depicted in FIGS. 6–9 are positioned on each side of the seat in a manner similar to that depicted in FIG. 2.

Figure 10:
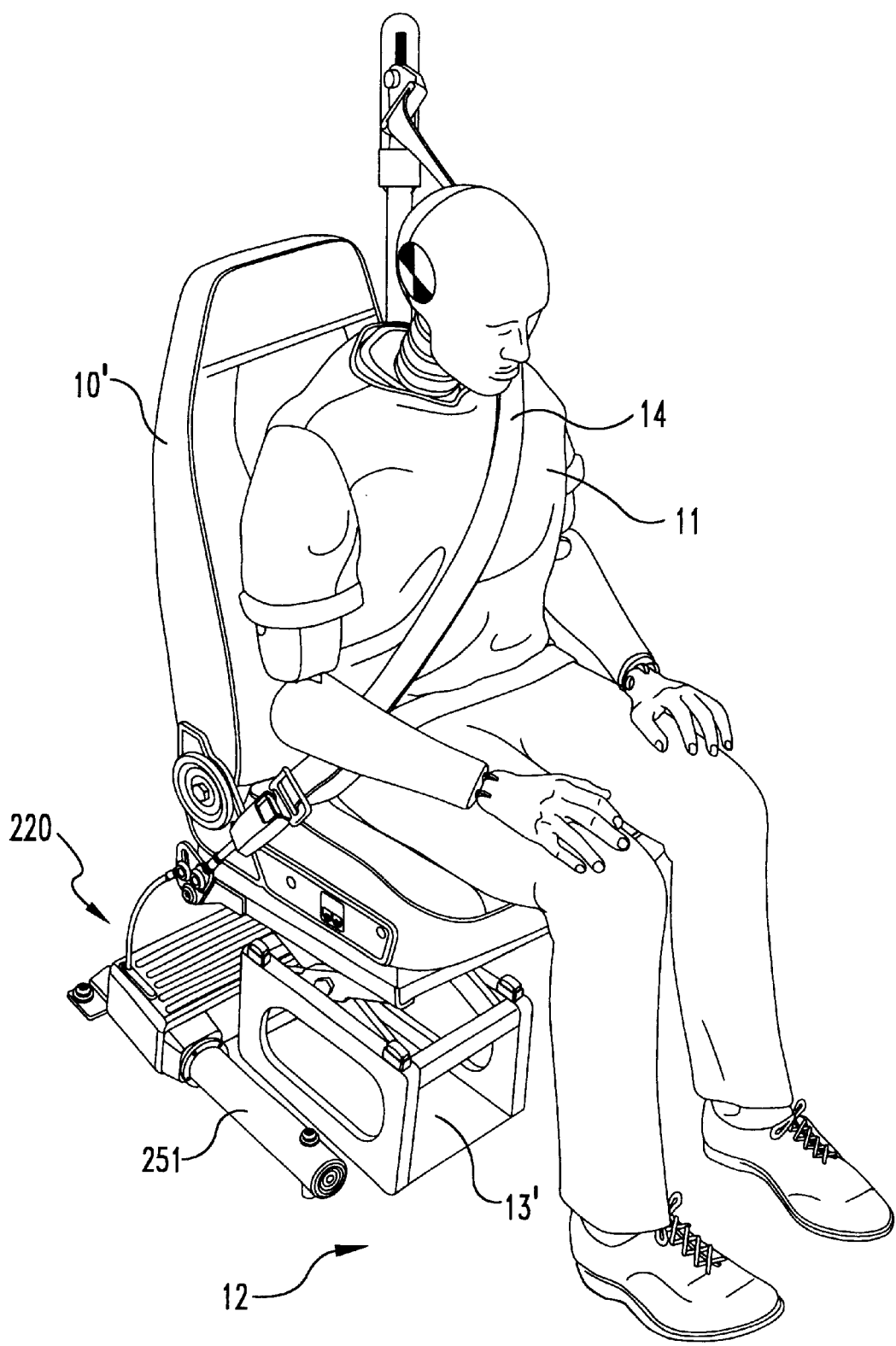
FIG. 10 is a side, perspective view of an alternate preferred embodiment of the seat incorporating the present invention.

FIG. 10 depicts an alternate typical suspension seat 10' utilized in a heavy truck. Seat 10' is mounted upon housing 13' atop vehicle floor 12. Occupant 11 is secured within the seat by means of a conventional three point belt assembly 14 as described above. Retracting assembly or means 220, including restraint assembly 251, is operably coupled to suspension seat 10'. Additional embodiments of the seat belt assembly are discussed above and shown in FIGS. 1–3.

Figure 11:
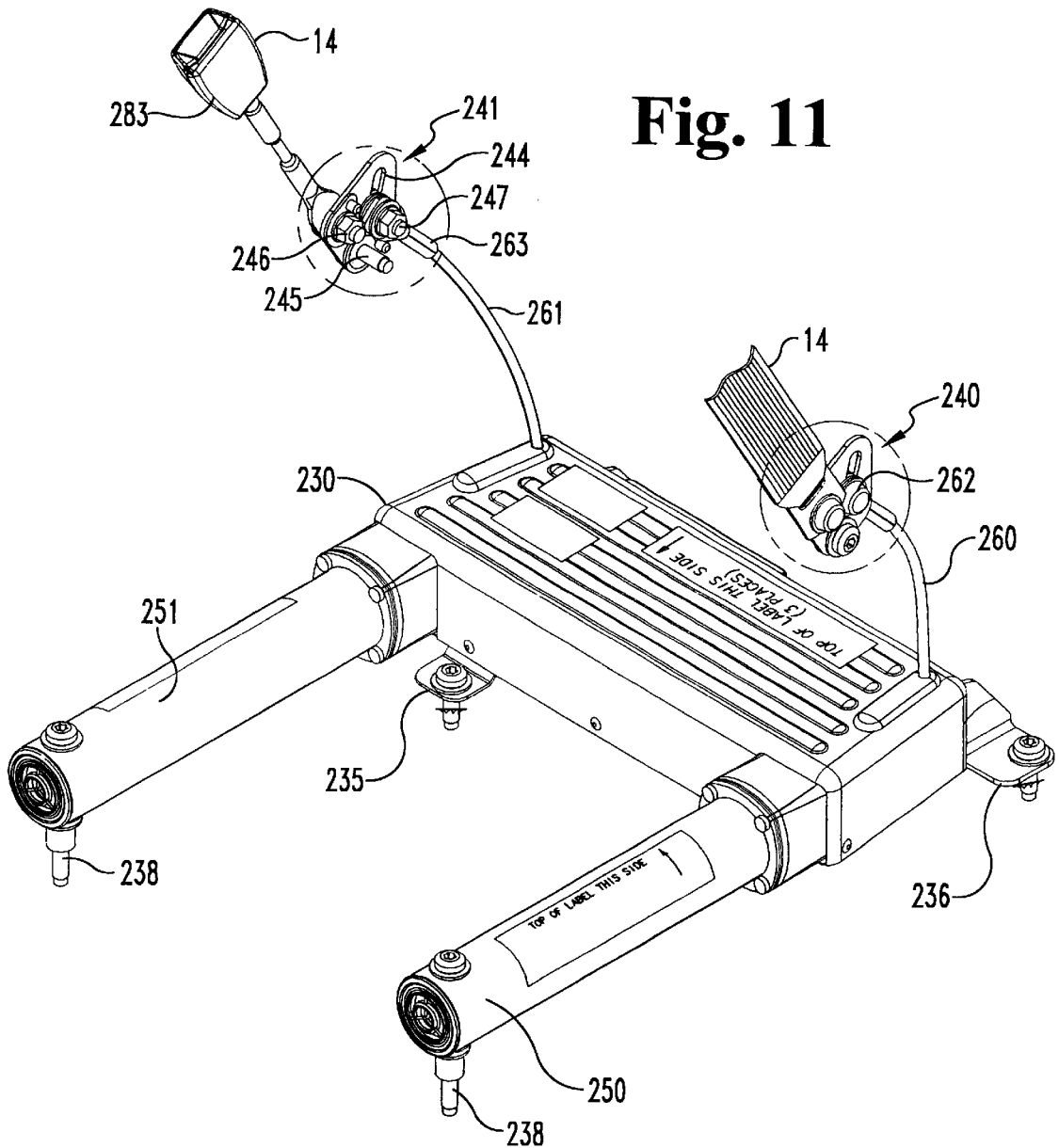
FIG. 11 is a side, perspective enlarged view of the seat retracting assembly used with the embodiment shown in FIG. 10.
Figure 12:
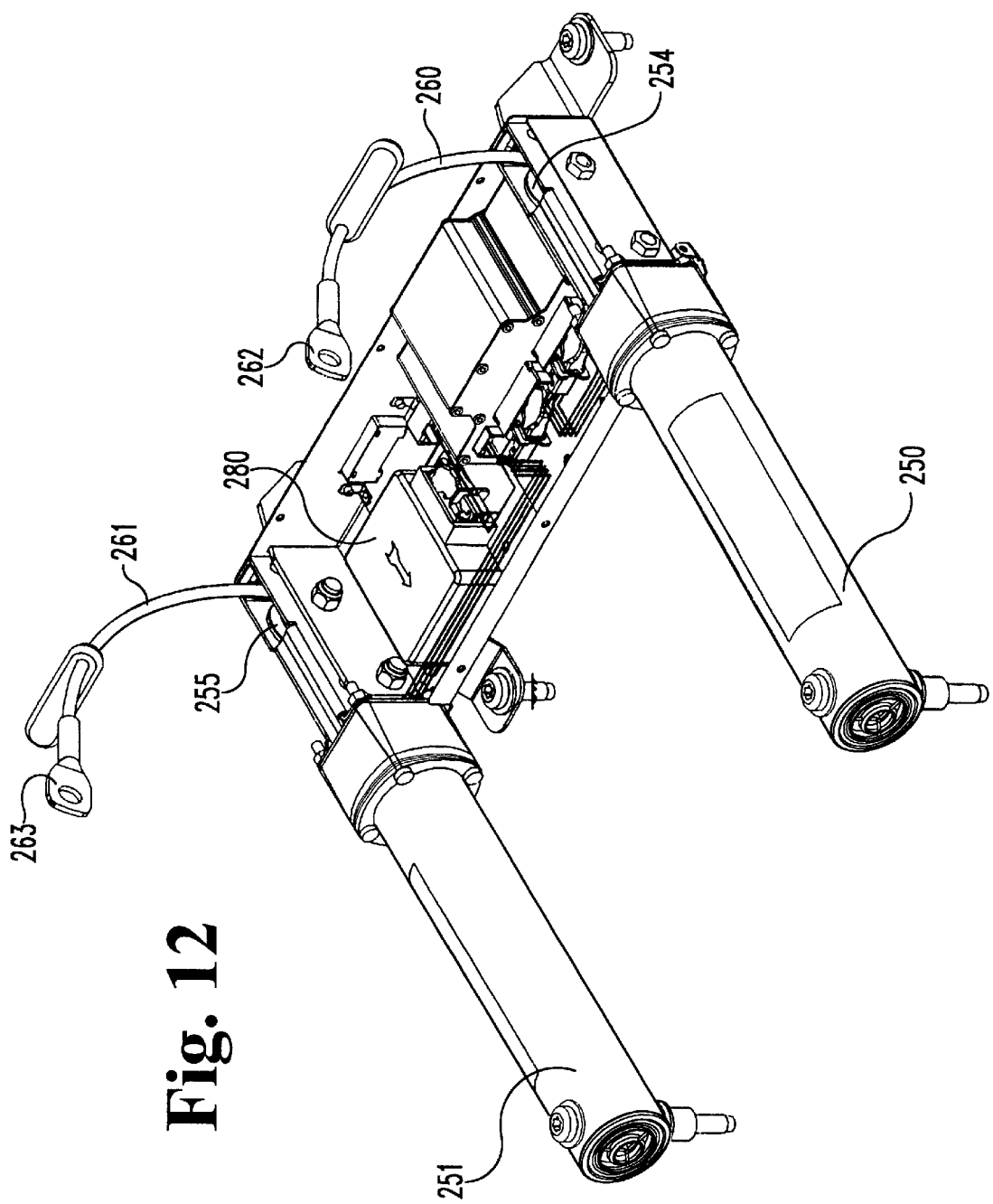
FIG. 12 is a side, perspective enlarged view of the seat retracting assembly of FIG. 11 with the cover removed.

Enlarged, side, perspective views of retracting assembly 220 are illustrated with cover 230 in place in FIG. 11 and with cover 230 removed in FIG. 12. Retracting assembly 220 includes restraint devices or assemblies 250 and 251. Restraint devices 250 and 251 are mounted to a base. Displacement members 260 and 261 have first ends 262 and 263 connected to mounting points on the seat and seat frame via linkages 240 and 241, and second ends connected to pistons in the restraint devices described below.

Alternately, ends 262 and 263 of displacement member 260 and 261 are connected directly to the seat frame of seat 10' without linkages 240 and 241 being provided. In this alternate embodiment, the buckle 283 and belt 282 are also mounted directly to the seat frame, but not necessarily at the same points at the displacement members. When belt 282 and buckle 283 are directly mounted to the seat and seat frame, retracting assembly 220, upon activation, pulls the seat down toward the floor without first tightening the belt assembly.

Preferably displacement members 260 and 261 include at least a flexible portion. Bearings or pulleys 254 and 255 are in contact with displacement members 260 and 261 between the first ends and the second ends. Restraint devices 250 and 251 are identical and thus the following description for restraint device 250 will apply equally to restraint device 251.

Linkage 240 is symmetric to linkage 241. As illustrated in FIG. 11, in linkage 241, first end 263 of displacement member 261 is connected to connector plate 244 with bolt 247 or similar attachment. First end 263 may be fixedly or pivotally attached to connector plate 244, which optionally includes a slot for adjustment. Linkage 241 includes pivot point 245 which is pivotally mounted to the seat and seat frame. Belt assembly 14 is mounted to linkage 241 with bolt 246. During installation linkage 241 is adjusted to the correct position and tension. It will be understood that screws, rivets, or other standard connectors of sufficient strength may be substituted for bolts 246 and 247. Appropriate complementary hardware such as nuts, washers, bushings, and spacers are also included.

Plate 244 is identical to plate 81 except slot 248 is provided and receives bolt 247. Bolt 247 is slidably received within slot 248, and is initially positioned at the slot end closer to pivot point 245. When bolt 247 is initially pulled by displacement member 261, it rotates plate 244 around pivot point 245 until the slack is removed from belt assembly 14. Bolt 247 then slides to the farther slot end of slot 248. This provides a short lever arm to maximize rotation of plate 244 under the relatively light load of removing the slack in belt assembly 14 and the initially slow movement of displacement member 261. The rotation of plate 244 and sliding of bolt 247 also provides greater time between activation and the full load of the seat being pulled by displacement member 261 when the lever arm is eliminated, allowing a greater initial acceleration of displacement member 261.

Retracting assembly 220 is mounted to the vehicle floor using multiple bolts and brackets 236 and 238. A sensor bracket 235 is also bolted to the vehicle floor. Crash sensor 280 is mounted within retracting assembly 220 and is operably coupled (not shown) to restraint devices 250 and 251. Crash sensor 280 may be various standard types of impact, motion, acceleration, rollover or similar sensors as made and sold by various manufacturers. Crash sensor 280 may be mounted elsewhere in the vehicle as preferred, so long as it is operably coupled to restraint devices 250 and 251. In one example, an appropriate sensor is a Bosch A/B 6.2 crash sensor.

Figure 13:
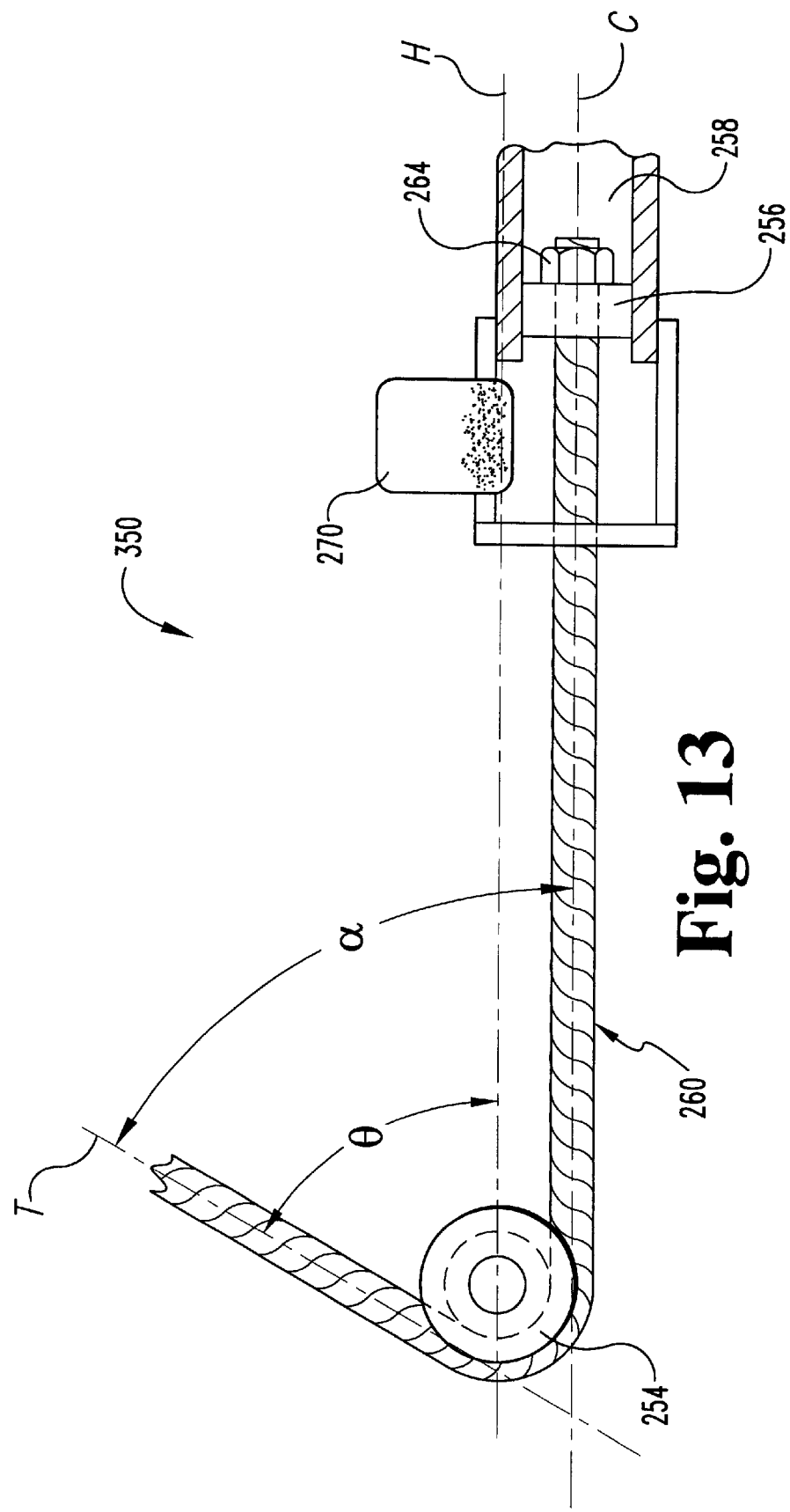
FIG. 13 is a side, cut-away view of one embodiment of a restraint assembly used with the embodiment illustrated in FIG. 12.

One preferred embodiment of restraint device 250 is shown in a cross-sectional view in FIG. 13. Piston 256 is movably mounted in a longitudinal displacement path within longitudinal fluid cylinder 258. Second end 264 of displacement member 260 is connected to piston 256. A fluid pressure source, such as pyrotechnic charge and container 270 is connected to fluid cylinder 258 and is operably coupled to crash sensor 280. Displacement member 260 extends from fluid cylinder 258 to a bearing or pulley 254 and continues to linkage 240. In one embodiment, displacement member 260 is flexible along the majority of its length. The displacement member can be made from wires, solid metals, alloys, braids, ropes or similar known materials having sufficient longitudinal strength, and includes connection hardware. The fluid pressure source can alternately be pressurized fluid with a mechanical trigger, or can be a hybrid of pressurized fluid and a pyrotechnic charge.

Longitudinal cylinder axis C is defined in a line through fluid cylinder 258 along the displacement path and is aligned with at least a portion of displacement member 260 including second end 264. Tension axis T is defined in a line intersecting linkage 240 and at least a portion of displacement member 260 including first end 262. The intersection of cylinder axis C and tension axis T form angle $\alpha$ (alpha), with bearing or pulley 254 contacting a flexible portion of displacement member 260 to form the angle. Angle $\alpha$ ( may be between zero (0) and 180 degrees, depending on the orientation of the cylinder.

Horizontal axis H is also illustrated in FIG. 13. In one embodiment horizontal axis H is parallel to cylinder axis C. The angle $\Theta$ (theta) between horizontal axis H and tension axis T can range from ninety degrees to zero degrees. One preferred range for angle $\Theta$ is between about 40 and about 70 degrees. An alternate preferred angle $\Theta$ is ninety (90) degrees. When $\Theta$ is between zero and ninety degrees a pull-down vector force and a horizontal restraining force is provided on the seat frame. When $\Theta$ is ninety degrees, a maximum pull-down force is provided.

Imparting an angle to the displacement member allows greater flexibility in the spatial arrangement of the retracting assembly. For example, the fluid cylinders can be mounted substantially horizontally, under the seat and adjacent the frame. Alternately, the displacement members can be doubled back around the pulleys with the cylinders vertically mounted substantially parallel to the seat back. Using different orientations, the required area within a vehicle for mounting the seat and assembly can be minimized. The use of a flexible displacement member minimizes the potential for damaging force to be applied transverse to the cylinder axis.

Figure 14:
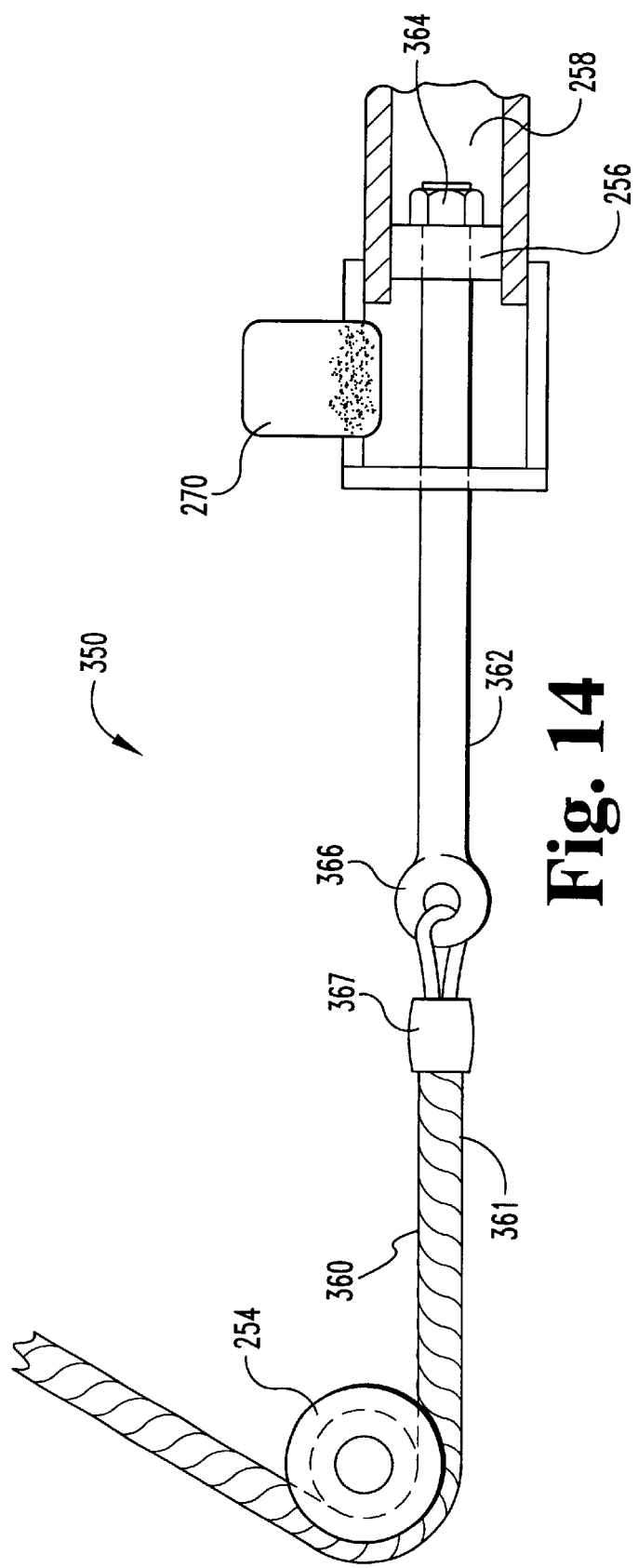
FIG. 14 is a side, cut-away view of an alternate embodiment of a restraint assembly use with the embodiment illustrated in FIG. 12.

An alternate preferred embodiment of restraint device 250 is illustrated in FIG. 14 with restraint device 350. Restraint device 350 functions substantially identically to restraint device 250, but uses displacement member 360. Displacement member 360 has a length with at least a first flexible portion 361 linked to a second portion 362 extending to the seat mounting point or linkage. Second portion 362 is connected to piston 256 at second end 364. The first or head end 366 of second portion 362 is coupled to the second or tail end 367 of first portion 361. First portion 361 can be a cable, chain or similar flexible material. Second portion 362 is preferably a rod which is attached at one end to the piston, and which has a sufficient length, to extend a distance beyond fluid cylinder 258 after the piston is moved along the displacement path. Typical connectors such as rings, eye loops, chain links, welds, or wires may be used to link head end 366 and tail end 367. The displacement member passes through a seal (not shown) when entering the fluid cylinder. Use of rod 362 allows a tight seal at the entry point into the cylinder.

With a similar operation as described above, upon crash, seat retracting assembly 220 operates to tighten the belt means around the user and move the seat frame and seat towards the vehicle floor. When crash sensor 280 detects an activation event, it sends a signal to pyrotechnic charge 270 attached to restraint assembly 250. When the pyrotechnic charge is activated, it supplies fluid pressure to the fluid cylinder impelling the piston along the displacement path. The piston transmits the displacement force to the displacement member and by association to linkage 240 and the seat and seat frame. The "pull" of the displacement member tightens the belt by first pivoting the linkage around seat connection 245 and then drawing the seat assembly towards the floor.

Various mechanisms may be used to prevent or impede return travel of the piston within the fluid cylinder, examples include maintaining fluid pressure, one-way locking clutches, or ratchet mechanisms. Preferably there are restraint assemblies on each of the two lower points of the belt, such as assemblies 250 and 251 or alternately two assemblies 350. Preferably both assemblies such as 250 and 251 are activated simultaneously.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A seat restraint system mountable to a vehicle floor comprising:
   a seat frame and seat;
   vehicle suspension seat means connected to said seat frame and seat and for mounting to a vehicle floor operable to allow said seat frame and seat to move to and from the vehicle floor;
   belt means mounted to said seat frame and seat and operable to restrain an occupant on said seat and,
   seat retracting means connected to said seat frame and seat and operable to move said seat frame and seat toward the vehicle floor upon crash, wherein said seat retracting means includes:
   a fluid cylinder;
   a piston within said fluid cylinder; and,
   a displacement member having a first end, a second end and at least one flexible portion therebetween, wherein said first end is connected to said seat frame and seat, and
   wherein said second end is connected to said piston, and; said seat retracting means upon crash applying fluid pressure to said fluid cylinder moving said piston and said displacement member to move said seat frame and seat toward the vehicle floor.

2. The seat restraint system of claim 1 and further comprising a linkage pivotally mounted to said said seat frame and seat, wherein said belt means is connected to said seat frame and seat via said linkage, and said first end of said displacement member is connected to said seat frame and seat via said linkage.

3. The seat restraint system of claim 2 and further comprising a source of pressurized fluid connected to said fluid cylinder.

4. A seat restraint system mountable to a vehicle floor comprising:
   a seat frame and seat and having a mounting point;
   vehicle suspension seat means connected to said seat frame and seat and for mounting to a vehicle floor operable to allow said seat frame and seat to move to and from the vehicle floor;
   belt means mounted to said seat frame and seat and operable to restrain an occupant on said seat;
   a fluid cylinder mountable adjacent said seat frame and seat and having a cylinder axis;
   a piston oriented within said fluid cylinder;
   a displacement member having a first end and a second end and at least one flexible portion therebetween, wherein said first end is connected to said mounting point on said seat frame and seat, wherein a tension axis is defined intersecting said mounting point and extending along at least a portion of said displacement member, and wherein said second end is coupled to said piston;
   wherein said flexible portion of said displacement member is bent so that the intersection of said tension axis and said cylinder axis forms an angle between 0 and 180 degrees; and,
   wherein upon crash fluid pressure is applied to said fluid cylinder, moving said piston and said displacement member to move said seat frame and seat toward the vehicle floor.

5. The seat restraint system of claim 4 and further comprising a linkage pivotally mounted to said mounting point for said seat frame and seat wherein said belt means is connected to said mounting point via said linkage, and said first end of said displacement member is connected to said mounting point via said linkage.

6. The seat restraint system of claim 5 wherein said linkage tightens said belt means upon crash of the vehicle.

7. The seat restraint system of claim 6 wherein said linkage includes timing means to tighten said belt means prior to retraction of said seat frame and seat.

8. The seat restraint system of claim 5 wherein said displacement member is flexible along substantially its entire length.

9. The seat restraint system of claim 5 wherein said second end of said displacement member includes a rod portion with a head end and a tail end wherein said rod extends into said fluid cylinder and said tail end is attached to said piston and wherein said rod portion has a length such that said head end remains outside of said fluid cylinder after crash.

10. The seat restraint system of claim 5 wherein a horizontal axis is defined horizontal to the vehicle floor and wherein the intersection of said tension axis and said horizontal axis forms an angle between about 40 and about 70 degrees.

11. The seat restraint system of claim 5 wherein a horizontal axis is defined horizontal to the vehicle floor and wherein the intersection of said tension axis and said horizontal axis forms an angle of about 90 degrees.

12. The seat restraint system of claim 5 wherein said fluid cylinder is horizontally mounted adjacent said seat frame and seat.

13. The seat restraint system of claim 5 wherein said seat includes a seat back and said fluid cylinder is mounted substantially vertically, adjacent said seat back.

14. The seat restraint system of 5 further comprising a source of pressurized fluid connected to said fluid cylinder.

15. The seat restraint system of claim 14 wherein said source of pressurized fluid includes a pyrotechnic charge.

16. The seat restraint system of claim 15 and further compromising a crash sensor coupled to said source of pressurized fluid.

17. A seat restraint system adapted to mount to the floor of a vehicle comprising:
   a vehicle suspension seat including a seat and a seat frame adapted to mount atop a floor and movable to and from the floor;
   a suspension device connected to said seat frame;
   a sensor for mounting to the vehicle to detect a crash;
   a belt connected to said suspension seat to restrain an occupant thereon; and,
   a seat retractor connected to said suspension seat and operably connected to said sensor to move said suspension seat in its entirety toward said floor upon said sensor detecting a crash, wherein said seat retractor includes a displacement member having at least one flexible portion.

18. The seat restraint system of claim 17 further comprising an output connecter associated with said sensor and wherein said seat retractor is operably connected to said sensor via said output connector.

19. A seat restraint system adapted to mount to the floor of a vehicle comprising:
   a seat adapted to mount atop a floor;
   suspension structure connected to said seat operable to move said seat to and from the floor;
   a sensor for mounting to the vehicle to detect the crash of the vehicle;
   a belt for mounting to the vehicle to restrain an occupant upon the seat; and,
   a retractor mechanism including a displacement member having a flexible portion connected to said seat, to said belt and to said sensor, wherein said retractor mechanism once said sensor detects the crash of the vehicle will move said seat to the floor and tighten said belt.

* * * * *